United States Patent Office 2,705,813
Patented Apr. 12, 1955

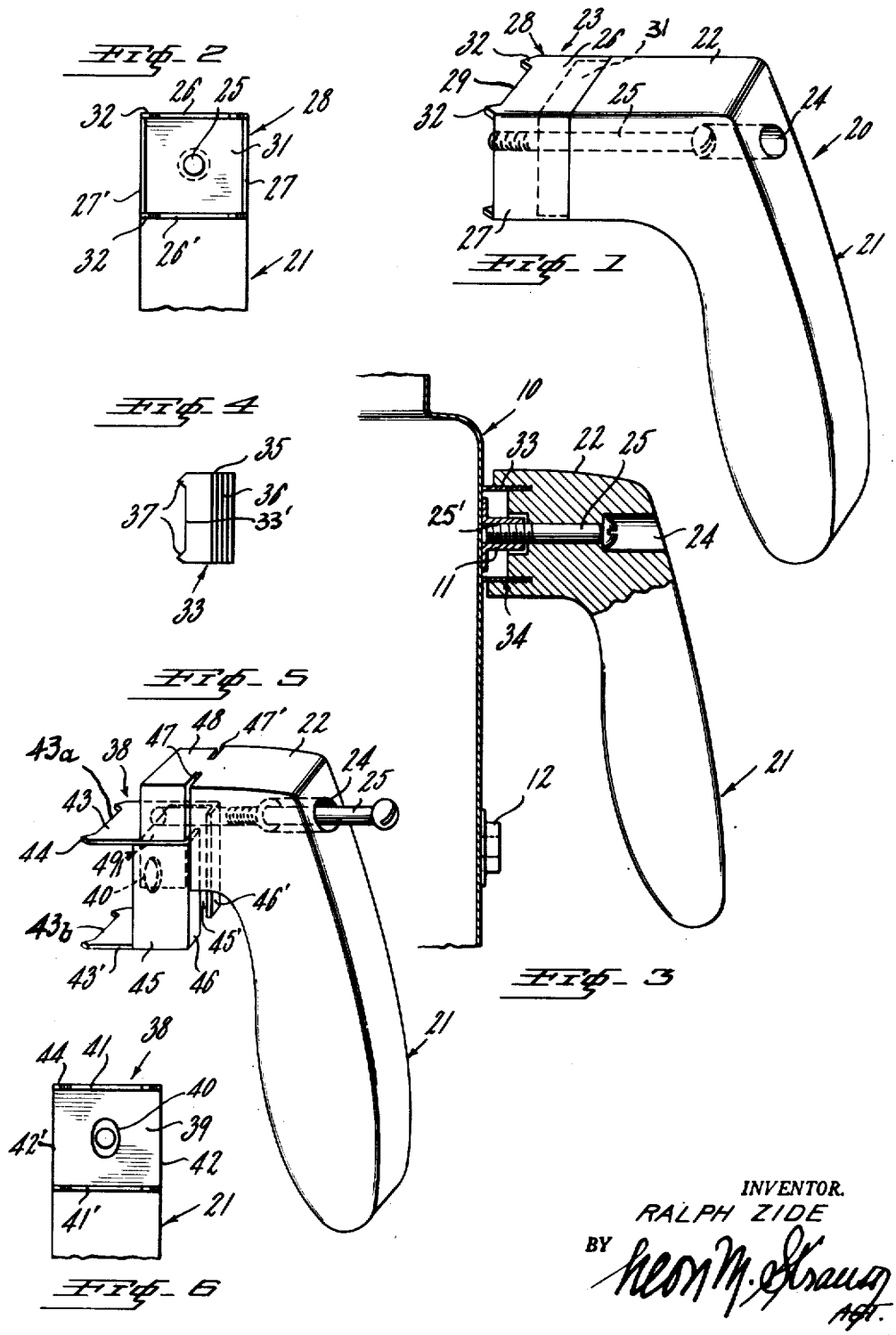

2,705,813

HANDLE ATTACHMENT FOR KITCHEN UTENSILS

Ralph Zide, Brooklyn, N. Y., assignor to Perc-Tone Aluminum Products, Inc., Brooklyn, N. Y., a corporation of New York Application January 12, 1952, Serial No. 266,159

2 Claims. (Cl. 16—116)

This invention relates to attaching or fastening means for handles of kitchen utensils, in particular of percolators.

Heretofore, it was necessary to replace a kitchen utensil if the hande broke or became loose and unusable. In attempting to replace such handles, it was virtually impossible to obtain in the open market suitable replacement parts. Often it was necessary to provide bolt holes in the body of the utensils to effect the securement of the replacement handle thereto.

It is evident that such work is time consuming and impractical for many reasons.

Accordingly, it is an object of the present invention to provide a novel handle structure which obviates the foregoing and other difficulties.

It is another object of the invention to provide means facilitating ready attachment and removal of a handle with respect to the body of the kitchen utensil without requiring any modification or reconstruction of the body.

It is a further object of the present invention to provide means affording rigid and non-displaceable securement of a handle structure to a kitchen utensil during manufacture thereof and also when it becomes necessary to replace a broken or worn handle.

Briefly described and according to the present invention, there is provided a handle attachment for detachable securement to a utensil body including at least one threaded fitting adapted to receive a bolt, comprising handle, bracket means engaging the handle and the utensil for spacing the handle from the utensil, bolt means having threads complementary to the threaded fitting to thereby connect the handle to the threaded fitting for securing the handle to the utensil in adjusted position thereon, the bracket means including spaced prongs for frictional engaging and bearing against the utensil body in response to tightening of the bolt means.

The above objects and brief description will be best understood by reference to the following detailed description of the invention when taken in conjunction with the drawing wherein:

Fig. 1 is a perspective view of one embodiment of a handle attachment constructed according to the present invention;

Fig. 2 is a fragmentary end elevational view taken from the left hand side of Fig. 1;

Fig. 3 is an elevational view, with parts broken away and shown in section, of another embodiment of a handle attachment shown attached to a percolator pot;

Fig. 4 is a plan view of a part of the bracket shown in Fig. 3 for securing the handle to the pot;

Fig. 5 is a fragmentary perspective view of another embodiment of the present invention; and Fig. 6 is a fragmentary end elevational view taken from the left hand side of Fig. 5.

Referring now to the drawing, there are shown handle attachments which are constructed for detachable securement to a kitchen utensil, such as the percolator 10 (Fig. 3) which is provided with spaced fittings 11, 12, each of which is internally threaded and adapted to receive a complementary bolt. For purposes of convenience two different types of commercially employed fittings are illustrated to which the handle attachments according to the invention may be readily applied.

Figs. 1 and 2 show a handle attachment 20 which includes a somewhat curved handle or grip 21 having an integral extension 22 of square cross section. Engaging the extension 22 of the handle 21 is a tubular bracket 23 for spacing the handle 21 from the percolator body 10 and maintaining the handle out of direct contact with same. The handle 21 is provided with a countersunk elongated bore 24 which extends longitudinally of the handle extension 22 and receives a bolt 25, the latter being threaded to engage the threaded fittings 11 or 12, for securing the handle 21 to the percolator pot or utensil 10 in adjusted position thereon. The bracket 23 is made from metal or like material and includes opposed pairs of walls 26, 26' and 27, 27' which are secured together to provide an open ended tubular piece or body square in cross section and forming a continuation of extension 22. The inner faces of walls 26, 26' and 27, 27' cooperate to form a square socket for embracingly receiving a complementary bearing member 31 secured to or formed integrally with extension 22 and of a reduced section with respect to the latter.

Arranged adjacent the corners of bracket or body 23 at the other open end thereof are prongs 32 which project outwardly of the body and form bearing means for frictionally engaging and somewhat penetrating the body of utensil 10 (without piercing same) in response to tightening down of the bolt 25 in one of the fittings 11 or 12. The prongs 32 engage spaced peripheral locations of the body or pot 10 and the connecting spacer edges or wall ends 29 prevent deep cutting of the prongs 32 into the body 10, while rigid, non displaceable securement of the handle 21 to the utensil 10 is assured.

To secure the attachment 20 to the utensil, the bolt 25 is passed through the hole 24 of the handle for engagement with the threaded bore 25' of fitting 11. Upon tightening the bolt, the prongs 32 bear against or somewhat penetrate the periphery of the utensil 10 and thus exert increased friction on the latter to prevent accidental displacement of the handle 21 from its adjusted and tightened position.

Referring now to Figs. 3 and 4, there is disclosed a modified handle attachment in which the bracket 23 is replaced by a pair of spaced die-stamped plates 33, 34 arranged in spaced parallel relation and on opposite sides of the bolt opening 24 of the handle 21. The plates 33, 34 are of like structure and are spaced from fitting 11 to avoid heat transfer from the latter. Fitting 11 extends into the recessed end of handle 22, to bring the transfer of heat from utensil body 10 and fitting 11 to handle end 22 to a minimum. Also bolt 25 engaged in fitting 11 is of such length as to minimize direct heat transfer from the utensil body 10 to bolt 25, as shown in Fig. 3. As can be seen in Fig. 4, each plate 33, 34 includes at one end a portion 35 which is knurled or ridged, as indicated at 36. The portion 35 is driven into the handle end or extension 22 or is embedded therein during forming of the plastic handle, as clearly shown in Fig. 3. Projecting beyond the transverse connecting edge 33' of each plate 33, 34 are prongs 37 integral therewith and preferably arranged at the corners of each plate to thereby engage spaced peripheral portions of the utensil 10.

The handle attachment of Figs. 3 and 4 is attached to the utensil, as previously described in connection with Figs. 1 and 2.

In Figs. 5 and 6, there is shown a further modified handle attachment in which the handle 21 is secured to the utensil 10 by means of the bracket 38 which includes a square base plate 39 provided with an oval-shaped bolt opening 40 and including opposed pairs of edges 41, 41' and 42, 42'. Arranged normal to the base plate 39, is a first pair of spaced walls 43, 43' which project in one direction from the opposed edges 41, 41' of the base plate 39. The walls 43, 43' are provided with prongs 44 which are engageable with the utensil 10, as hereinabove explained. Arranged substantially normal to the walls 43, 43' is a second pair of walls 45, 45' which project in a direction opposite to said one direction from the other pair of edges 42, 42' of the base plate 39. Carried by the ends of the walls 45, 45' remote from the base plate 39 are the aligned flanges 46, 46' which are coplanar and extend toward and terminate short of each other. The extension 22 is provided with aligned slots 47, 47' which guidingly engage the flanges 46, 46' upon insertion of the bearing member 48 in the socket 49 defined by base plate 39, walls 45, 45' and flanges 46, 46'.

In effecting the securement of the handle attachment illustrated in Figs. 5 and 6 to the utensil 10, the bearing member 48 is inserted in socket 49 whereupon the bolt 25 is passed through bolt opening 24 and threadily engages the oval-shaped bolt opening 40. The opening 40 is oval-shaped to permit the device to be readily applied to fittings of various types and sizes, as shown.

It is well understood that the connecting or stop wall edges 43a, 43b between the upper and lower pairs of prongs 44 effectively prevent the latter from damaging the material or piercing same when the handle 21 is being applied to the body 10, as hereinabove set forth.

It can thus be seen, that there has been provided according to the invention a handle structure for a utensil body from which a fitting extends for threaded engagement with a screw-threaded bolt to apply said handle to said utensil body; said handle comprising a main portion provided with an end for positioning adjacent said fitting, bracket means carried by said end of said handle and positioned to extend beyond said end of said handle and laterally spaced from said fitting, and prong means for abutting against said utensil body beyond said fitting, said main portion of said handle being provided with an elongated bore passing through said main portion centrally of said bracket means and in alignment with said fitting, whereby said bolt when inserted in said bore threadedly engages said fitting to thereby secure said handle with said bracket means in place on said utensil body, said bracket means including a pair of parallel spaced plates having lateral forward ends integral with and projecting beyond said bracket means, said lateral forward ends of said plates forming said prong means to thereby space the handle end from said utensil body at locations out of contact with said fitting thus reducing heat transfer therefrom to said handle, said handle end being recessed to space the latter from the adjacent fitting end in assembled condition of said handle on said utensil.

While several preferred embodiments of the invention have been shown and herein described, it will be understood that the same are capable of modifications without departure from the general scope and spirit of the invention as defined in the claims.

Having thus described the invention, what is claimed as new and desired to be secured by Letters Patent, is:

1. A handle attachment for a body of a utensil having at least one threaded fitting, comprising a handle provided with an extension and an elongated bore therethrough, bracket means for maintaining said handle out of direct contact with said utensil body, threaded bolt means receivable within said elongated bore and engageable within said threaded fitting for securing said handle to said utensil and detachment therefrom, said bracket means including a substantially flat base plate provided with an aperture aligned with said elongated bore of said extension and with the threads of said fitting, said base plate being further provided with opposed pairs of edges, a first pair of spaced walls arranged normal to said base plate and projecting in one direction from one pair of opposed edges of said base plate, said first pair of spaced walls including pointed ends for frictionally engaging said utensil body in response to tightening of said bolt means, a second pair of spaced walls arranged substantially normal to said first pair of walls and projecting in a direction opposite to said one direction from the other pair of opposed edges of said base plate, and aligned flange means extending inwardly from said second pair of walls and cooperating with the latter and said base plate to form a socket for embracingly receiving a portion of said handle, said handle being provided with aligned slots for guidingly engaging said flange means.

2. A handle attachment for a utensil body from which a fitting extends for threaded engagement with a screw threaded bolt to apply said handle to said utensil body; said handle comprising a main portion provided with an end for positioning adjacent said fitting, bracket means carried by said end of said handle and positioned to extend beyond an end of said handle end and laterally spaced from said fitting, and prong means for abutting against said utensil body beyond said fitting, said main portion of said handle being provided with an elongated bore passing through said main portion centrally of said bracket means and in alignment with said fitting, whereby said bolt when inserted in said bore threadedly engages said fitting to thereby secure said handle with said bracket means in place on said utensil body, said bracket means including a pair of parallel spaced plates having lateral forward ends integral with and projecting beyond said bracket means, said lateral forward ends of said plates forming said prong means to thereby space the handle end from said utensil body at locations out of contact with said fitting thus reducing heat transfer therefrom to said handle, said handle end being recessed to space the latter from the adjacent fitting end in assembled condition of said handle on said utensil.

References Cited in the file of this patent

UNITED STATES PATENTS

| | | |
|---|---|---|
| 1,935,253 | Stuart | Nov. 14, 1933 |
| 2,172,524 | Stevens | Sept. 12, 1939 |

FOREIGN PATENTS

| | | |
|---|---|---|
| 423,478 | Great Britain | Feb. 1, 1935 |